United States Patent
Touret et al.

(10) Patent No.: US 9,814,004 B2
(45) Date of Patent: Nov. 7, 2017

(54) SATELLITE COMMUNICATION DEVICE, SATELLITE COMMUNICATION SYSTEM COMPRISING SUCH A DEVICE AND METHOD FOR MANAGING THE RESOURCES ALLOCATED WITHIN SUCH A SYSTEM

(71) Applicant: THALES, Neuilly-sur-Seine (FR)

(72) Inventors: Marc Touret, Gennevilliers (FR); Bertrand Prillard, Gennevilliers (FR); Yves Guillerme, Gennevilliers (FR); Eric Privat, Gennevilliers (FR)

(73) Assignee: Thales, Courbevoie (FR)

( * ) Notice: Subject to any disclaimer, the term of this patent is extended or adjusted under 35 U.S.C. 154(b) by 374 days.

(21) Appl. No.: 14/554,670

(22) Filed: Nov. 26, 2014

(65) Prior Publication Data
US 2015/0156734 A1    Jun. 4, 2015

(30) Foreign Application Priority Data
Nov. 29, 2013 (FR) ..................... 13 02784

(51) Int. Cl.
*H04W 52/46* (2009.01)
*H04B 7/185* (2006.01)
*H04W 72/04* (2009.01)
*H04B 17/40* (2015.01)

(52) U.S. Cl.
CPC ........ *H04W 52/46* (2013.01); *H04B 7/18513* (2013.01); *H04W 72/0413* (2013.01); *H04W 72/0473* (2013.01); *H04B 17/40* (2015.01)

(58) Field of Classification Search
CPC  H04B 7/185; H04B 7/18513; H04B 7/18597; H04B 17/02; H04B 17/40; G01S 5/0252; H01Q 1/246; H04W 52/46; H04W 52/52; H04W 52/283; H04W 52/288; H04W 64/00; H04W 64/0003; H04W 72/0413; H04W 72/0473
See application file for complete search history.

(56) References Cited

U.S. PATENT DOCUMENTS

| | | | |
|---|---|---|---|
| 6,600,929 B1 * | 7/2003 | Toncich ............... | H04W 52/283 455/129 |
| 2003/0008615 A1 | 1/2003 | Andenaes | |
| 2007/0268846 A1 * | 11/2007 | Proctor, Jr. ........ | H04B 7/15535 370/279 |
| 2009/0195444 A1 * | 8/2009 | Miller ................ | H04B 7/18513 342/352 |
| 2009/0245427 A1 * | 10/2009 | Alagha ............... | H04B 7/18523 375/329 |

(Continued)

FOREIGN PATENT DOCUMENTS

EP       2273693 A2    1/2011

*Primary Examiner* — Alpus H Hsu
*Assistant Examiner* — Dharmesh Patel
(74) *Attorney, Agent, or Firm* — Baker Hostetler LLP

(57) ABSTRACT

In the field of satellite communication systems, a method is provided for managing communication resources allocated by central control equipment to the various terminal communication devices within a global satellite communication system. In particular, the management of communication resources by way of the monitoring of the equivalent isotropically radiated power transmitted by a terminal of the satellite communication system is provided.

14 Claims, 3 Drawing Sheets

(56) References Cited

U.S. PATENT DOCUMENTS

| | | | |
|---|---|---|---|
| 2011/0007647 A1* | 1/2011 | Miller | H04B 7/18586 370/252 |
| 2012/0188880 A1 | 7/2012 | Beeler et al. | |
| 2012/0191824 A1 | 7/2012 | Davis et al. | |

* cited by examiner

SATELLITE COMMUNICATION DEVICE, SATELLITE COMMUNICATION SYSTEM COMPRISING SUCH A DEVICE AND METHOD FOR MANAGING THE RESOURCES ALLOCATED WITHIN SUCH A SYSTEM

CROSS-REFERENCE TO RELATED APPLICATION

This application claims priority to foreign French patent application No. FR 1302784, filed on Nov. 29, 2013, the disclosure of which is incorporated by reference in its entirety.

FIELD OF THE INVENTION

The present invention concerns the field of satellite communication systems and more precisely relates to a method for managing communication resources allocated by central control equipment to the various communication terminals within a global satellite communication system. Here the term communication resources notably denotes bandwidth and transmitted power, the present invention more precisely pertaining to power optimization.

In particular, the invention concerns the management of communication resources by way of the monitoring of the equivalent isotropically radiated power transmitted by a terminal of the satellite communication system.

BACKGROUND

In the field of satellite communications, international technical standards, such as the standards defined by the International Telecommunication Union, define recommendations in various sub-fields such as the efficient management of the spectrum or the propagation of electromagnetic waves.

In particular, these standards recommend the observance of certain constraints regarding the equivalent isotropically radiated power density of Earth communication stations transmitting in a satellite communication network. These constraints are defined by a maximum power threshold to be observed by transmitting Earth stations to limit the interference generated on satellites adjacent to the satellite targeted by the station.

The equivalent isotropically radiated power of an Earth station can be computed from the link budget. In other words, it is possible to compute the minimum power at which a station must transmit to comply with a given useful bit rate of transmission and a target signal-to-noise ratio. This computation takes into account the parameters of the waveform of the transmitted signal and the characteristics of the stations of the network as well as those of the satellite. This computation can be performed by resource control equipment to control the transmission power of a signal made by an Earth station via a servo loop.

If the computed power is above the recommended limit, resource control effects a lowering of the bit rate requested of the station so that its power decreases.

To carry out an accurate computation of the equivalent isotropically radiated power, it is necessary to accurately model the various uncertainties of the transmission channel, which requires considerable effort to be expended on calibrating the equipment. Additionally, in the case of mobile Earth stations, notably airborne stations, wide variations in temperature increase the uncertainties on the various gains of the transmission channel. The consequence of these uncertainties is a limitation of the maximum bit rate allocated to a station due to the inaccuracy of the link budget computations. In other words, the computed power setpoint exhibiting a deviation in relation to the power actually transmitted, the resources cannot be allocated optimally to come as close as possible to the maximum authorized power limits.

In other words, when several Earth stations dynamically share the same satellite communication resources, the resource control equipment shares the frequency band between these stations but also the transmissive power. The power sharing is all the more optimal when the transmitted equivalent isotropically radiated power is accurate with respect to the power setpoint given by the resource control equipment. In the opposite case, the resources of the system are not used to their full capability.

SUMMARY OF THE INVENTION

The present invention therefore aims to palliate the problem of uncertainty in the computation of the equivalent isotropically radiated power, which renders the allocation of communication resources to the various users of a satellite communication system sub-optimal.

Solutions enabling an accurate computation of the equivalent isotropically radiated power are usually based on a precise frequency and temperature calibration of the equipment of the transmission chain of a transmitting Earth station. This solution is restrictive because it depends on the components used, which can be renewed, rendering the calibration obsolete.

The present invention makes it possible to respond to the aforementioned problem and overcome the limitations of the known solutions by way of an accurate and continuous estimation of the deviation between the power setpoint computed by the resource control equipment and the equivalent isotropically radiated power effectively transmitted by an Earth station.

The subject of the invention is thus a satellite communication device comprising an antenna for communicating with a satellite, said device including a measurement module configured to carry out a plurality of measurements of the equivalent isotropically radiated power of the antenna, a reception module suitable for receiving, periodically, an equivalent isotropically radiated power setpoint to be applied to the signal transmitted by said antenna, said setpoint being computed by control equipment to observe a target link budget on the satellite link between said communication device and another device of the same network, a computation module configured to compute an average, over a first time interval, of said plurality of power measurements, compute an average, over a second time interval substantially identical to said first time interval, of said received power setpoints, compute the deviation between the average of the power setpoints and the average of the power measurements, a transmission module suitable for transmitting said deviation to said control equipment, via said satellite.

The device according to the invention comprises, according to a particular aspect of the invention, a high-power amplifier wherein said measurement module is implemented, the power being measured at the output of said high-power amplifier and being corrected for the gain of the antenna.

The device according to the invention comprises, according to a particular aspect of the invention, an RF chain connected at its input to the output of the high-power amplifier and at its output to the antenna, the measured power at the output of said high-power amplifier being furthermore corrected for the gain of the RF chain.

According to another particular aspect of the device according to the invention, the measured output power of the high-power amplifier is a peak power and this power is corrected for the peak factor of the modulation of the transmitted signal.

According to another particular aspect of the device according to the invention, the measured power is corrected for a measurement bias depending on the power difference between a modulated carrier and an un-modulated carrier.

According to another particular aspect of the device according to the invention, said averages are sliding averages over a chosen time horizon.

Another subject of the invention is a satellite communication system comprising at least one satellite communication device according to the invention and equipment for controlling the resources allocated within said system, said control equipment comprising:
  a computation module suitable for computing an equivalent isotropically radiated power setpoint as a function of a target link budget to be attained on the satellite link between a first communication device and a second communication device,
  a module for transmitting this power setpoint to said first device,
  a module for receiving a deviation between said power setpoint and the equivalent isotropically radiated power transmitted by said first device, said deviation being transmitted by said first device,
  a resource management module configured to allocate more or fewer communication resources to said first device or to other devices of the system as a function of said deviation.

According to a particular aspect of the system according to the invention, said resource management module is configured to update the maximum admissible equivalent isotropically radiated power by adding said received power deviation to it.

According to a particular aspect of the system according to the invention, said resource management module is configured to make the following resource allocation decisions:
  if the power setpoint transmitted to said first device is strictly below the maximum admissible equivalent isotropically radiated power, allocate the available resources to said first device or to other devices of the system,
  if the power setpoint transmitted to said first device is strictly above the maximum admissible equivalent isotropically radiated power, reduce the resources allocated to said first device.

According to a particular aspect of the system according to the invention, said control equipment includes a loop for slaving the power of said first device configured to adjust the power setpoint transmitted to said first device as a function of the resources allocated to said first device and of a target signal-to-noise ratio measured on the link between said first device and said second device.

According to a particular aspect of the system according to the invention, the allocated communication resources are bit rate or spectral efficiency resources.

Another subject of the invention is a method for controlling resources allocated within a satellite communication system, comprising at least one satellite communication device and equipment for controlling the resources within said system, said method comprising the following steps:
  periodically computing an equivalent isotropically radiated power setpoint as a function of a target link budget to be attained on the satellite link between a first communication device and a second communication device,
  carrying out a plurality of measurements of the equivalent isotropically radiated power of the antenna of said first device,
  computing an average, over a first time interval, of said plurality of power measurements,
  computing an average, over a second time interval substantially identical to said first time interval, of said power setpoints,
  computing the deviation between the average of the power setpoints and the average of the power measurements,
  allocating more or fewer communication resources to said first device or to other devices of the system as a function of said deviation.

The method according to the invention can also comprise a step of updating the maximum admissible equivalent isotropically radiated power by adding said power deviation to it.

The method according to the invention can also comprise the following resource allocation decision step:
  if the power setpoint transmitted to said first device is strictly below the maximum admissible equivalent isotropically radiated power, allocate the available resources to said first device or to other devices of the system,
  if the power setpoint transmitted to said first device is strictly above the maximum admissible equivalent isotropically radiated power, reduce the resources allocated to said first device.

BRIEF DESCRIPTION OF THE DRAWINGS

Other features and advantages of the present invention will become more apparent upon reading the following description, with reference to the appended drawings which represent.

DETAILED DESCRIPTION

Figure 1:
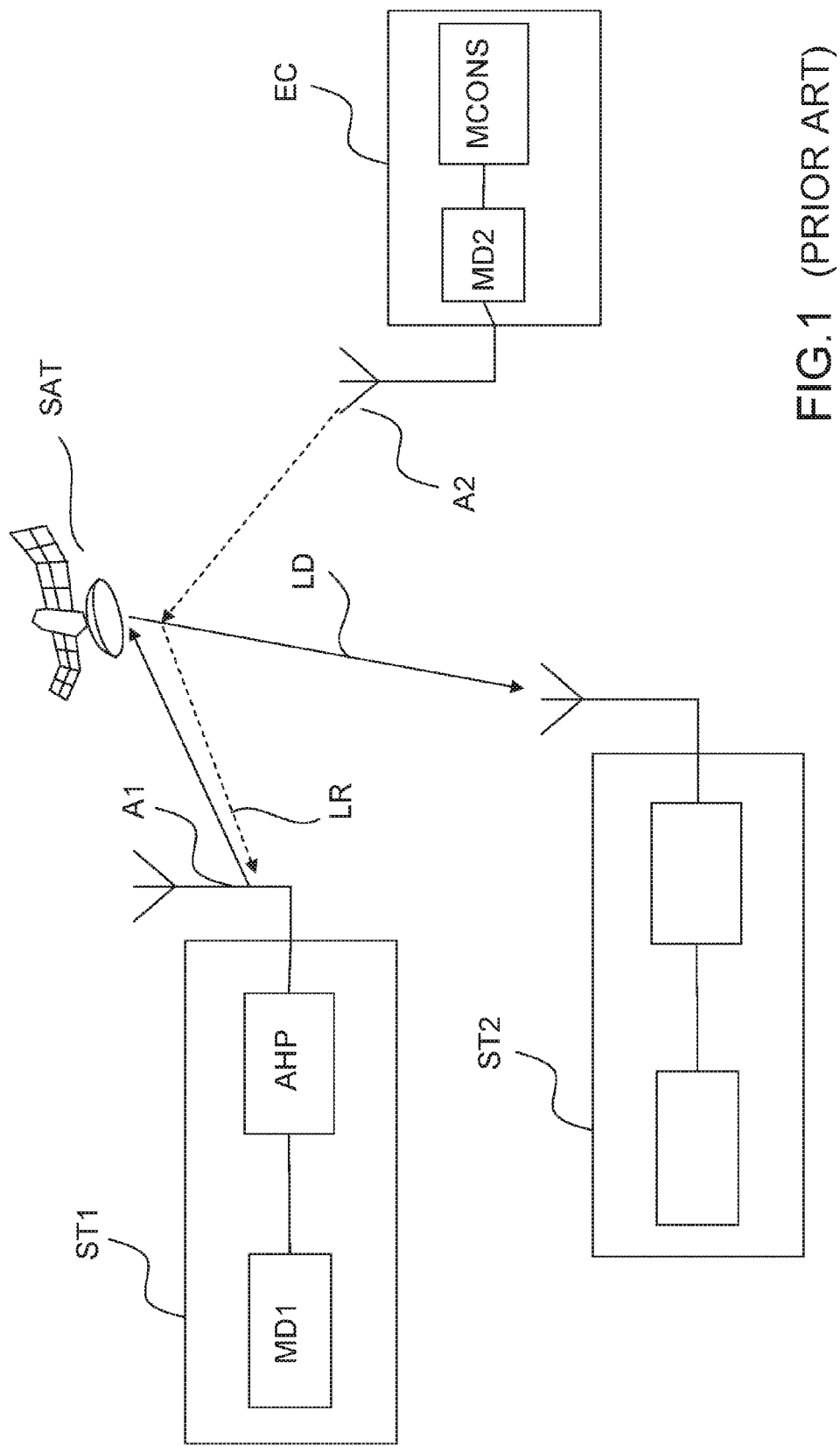
FIG. 1, a diagram of a satellite communication system of the prior art.

FIG. 1 illustrates, on a diagram, a satellite communication system SAT comprising at least one Earth station ST1, which can be embedded in a vehicle, particularly an aircraft, and central control equipment EC in charge of managing the overall communication resources of the system for all the stations seeking to communicate via the satellite SAT. By way of illustration two Earth stations ST1, ST2 are represented in FIG. 1, it being understood that in the case of a real-world application the satellite communication system may be composed of a large number of stations.

In particular, the control equipment EC is in charge of controlling the power of the signal transmitted by the stations ST1, ST2 of the network so as to observe the ordained limits of equivalent isotropically radiated power, in order to avoid creating interference for the neighbouring satellites SAT but also to manage in an optimal way the resources allocated to the various stations of the network for communicating.

For this purpose, the control equipment EC includes a module for computing a power setpoint transmitted for each station ST1, ST2. The power setpoint is computed from the link budget desired on the communication link LD between the station ST1 and another station ST2 of the network. The link budget depends notably on the desired bit rate for the link LD and on the target signal-to-noise ratio. The power setpoint is then transmitted to the station ST1 via a dedicated return path LR between the control equipment EC and the station ST1. For this purpose, the control equipment EC and the Earth station ST include means MD1, MD2 for transmitting/receiving the signal transmitted on the satellite link.

To guarantee a target signal-to-noise ratio, the control equipment EC can install a servo loop to slave the power of the Earth station by measuring the signal-to-noise ratio on the direct link LD and incrementing or decrementing the power setpoint periodically in order to converge on a steady state. To do this, the power setpoint is updated regularly, for example at the rate of one frame of the waveform of the transmitted signal, and periodically retransmitted to the Earth station ST1.

The Earth station ST1 includes at least means MD1 for transmitting and receiving a signal according to a satellite waveform, also known as a modem, a high-power amplifier AHP and a satellite antenna A1. The station ST1 can include other equipment required for the implementation of a satellite communication, this additional equipment not being represented in FIG. 1.

On receiving the power setpoint, the station ST1 adjusts the output power of the modem MD1 equal to the input power of the high-power amplifier AHP. The input power of the amplifier is determined taking into account the gain of the amplifier AHP, the gain of the antenna and where applicable the gain of other elements situated between the amplifier and the antenna such as an RF chain. As discussed in the introduction, these computations lead to an inaccuracy linked notably to the variability of the amplifier gain as a function of temperature. The power actually transmitted by the antenna A1 therefore exhibits a more or less large deviation from the power setpoint imposed by the control equipment EC.

Figure 2:
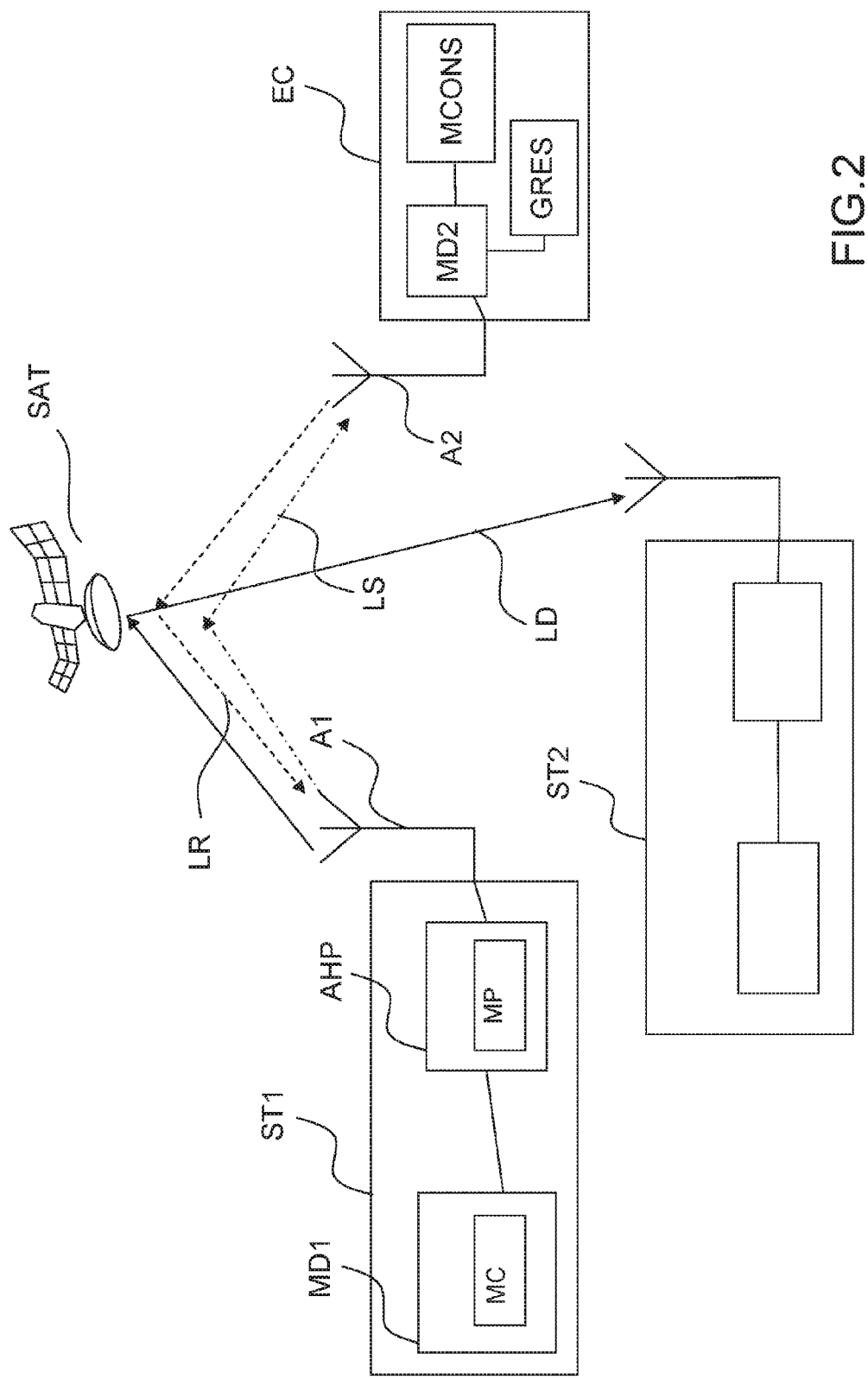
FIG. 2, a diagram of a satellite communication system according to the invention, FIG. 3, a flow chart detailing the steps of implementation of the method, according to the invention, for managing resources allocated within a satellite communication system.

FIG. 2 is a diagram of a satellite communication system adapted according to the invention to solve the drawbacks of the system described in FIG. 1.

The Earth station ST1 includes, in addition to the elements already described in FIG. 1, a module MP for measuring the equivalent isotropically radiated power, or EIRP, of the signal transmitted by the antenna A1. Advantageously, this module can be co-located with the high-power amplifier AHP so as to measure the power of the signal at the output of the amplifier. In this case, the gain of the antenna A1 must be added to obtain a measurement of the power of the signal transmitted by the antenna A1. Other equipment can be inserted between the amplifier AHP and the antenna A1, for example a radio frequency chain RF including other amplifiers and/or various filters. In this case, the gain of the RF chain must also be added to the power measurement at the output of the amplifier AHP to obtain a measurement of the EIRP transmitted at the output of the antenna A1.

The measurement module MP carries out a power measurement periodically with a predefined period.

If the measurement represents a peak power of the signal then the latter must be corrected for the peak factor of the modulation used. For example, if the signal is modulated using $\pi/4$-QPSK modulation, a correction of 3.5 dB must be made to the measurement.

Furthermore, in all cases, the measurement must also be corrected for the bias linked to the power measurement difference between an un-modulated carrier and a modulated carrier.

The Earth station ST1, according to the invention, also includes a computation module MC, advantageously co-located with the modem MD1 but which can also be implemented in the form of an interface module between the modem MD and the measurement module MP. It can also be incorporated into equipment located between the modem MD1 and the amplifier AHP, such as for example a unit for controlling the pointing of the antenna A1.

The computation module MC periodically receives, via the modem MD1, the power setpoint transmitted by the control equipment EC via the return link LR. The frequency of sending of this setpoint is for example synchronous with the frame rate of the waveform used to shape the signal.

In a particular variant of the invention, the modem MD1 triggers a request for power measurement to the measurement module MP before the end of a frame, taking account of the transmission time between the two entities.

The computation module MC periodically determines a first average of the powers measured by the measurement module MP over a given time horizon and a second average of the power setpoints received over the same time horizon. The chosen time horizon can be chosen to be equal to a given number of frames.

Advantageously, aberrant power measurements, in particular measurements corresponding to poor pointing of the antenna, can be eliminated from the computation of the average.

The computed averages can be sliding averages. One advantage of using a sliding average is that the computation module MC can be configured to directly incorporate a predetermined number of power measurements corresponding to the chosen time horizon and incorporate the power setpoints in the same way. Each time that a new measurement is available, it is transmitted by the measurement module MP to the computation module MC, which updates its sliding average by removing the oldest measurement from this average and adding the new value. Thus, the use of a sliding average makes it possible to simplify the complexity of implementation of the invention.

Finally, the computation module MC determines the deviation between the average of the power setpoints and the average of the measured powers and communicates this deviation to the modem MD1, which transmits this information to the control equipment EC via a signalling link LS.

On receiving the information about the deviation between the power setpoint and the antenna power actually measured, the control equipment EC modifies its policy of managing resources allocated to the network by way of a management module GRES.

In particular, the management module GRES updates the maximum admissible equivalent isotropically radiated power by adding to it the power deviation transmitted by the Earth station ST. Thus, the uncertainty between the power setpoint and the power of the signal actually transmitted by the antenna A1 is carried forward on the threshold value of the admissible power to limit the level of interference.

Two scenarios can then occur.

If the deviation between the power setpoint and the measured power is negative, this means that the power of the signal actually transmitted is above the setpoint allocated by the control equipment EC. In this case, a risk exists that the level of power of the signal exceeds the admissible level and the control equipment EC must then lower the power setpoint intended for the station ST by reducing, for example, the requisite bit rate for the satellite link associated with this station.

If, on the contrary, the deviation between the power setpoint and the measured power is positive, this means that the power of the signal actually transmitted is below the setpoint allocated by the control equipment EC. In this case, the resources of the system are not fully exploited. The resource management module GRES can be configured to reallocate the available resources to the station ST, for example by attributing a higher bit rate to it, or else allocate these resources to other stations of the network.

The allocated resources can also be expressed in terms of spectral efficiency instead and in place of the bit rate. The spectral efficiency depends notably on the type of modulation and on the type and output of the chosen correcting code.

The computation module MC that is included in the Earth station ST1 can be produced in software and/or hardware form.

Advantageously, this computation module can be implemented in software form in the medium access layer MAC of the modem MD1.

The measurement module MP that is included in the Earth station ST1 can also be produced in software and/or hardware form.

Advantageously, this measurement module can be incorporated into the high-power amplifier AHP.

The various modules implemented by the invention can notably consist in a processor and a memory. The processor can be a generic processor, a specific processor, an ASIC (Application-Specific Integrated Circuit) or an FPGA (Field-Programmable Gate Array).

Figure 3:
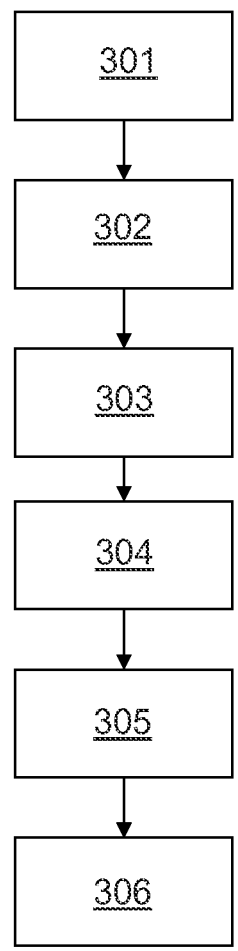

FIG. 3 summarizes on a flow chart the main steps of implementation of the method for controlling resources according to the invention.

In a first step 301, the control equipment EC periodically computes an equivalent isotropically radiated power setpoint as a function of a target link budget to be attained on the satellite link LD between the Earth station ST1 and another station ST2 of the network. This power setpoint is sent to the Earth station ST1 via a return satellite link LR.

In a second step 302, the Earth station ST1 carries out a plurality of measurements of the equivalent isotropically radiated power by the antenna A1.

In a third step 303, the average of the measured powers is computed over a first time interval.

In a fourth step 304, the average of the power setpoints is computed over the same time interval.

In a fifth step 305, the deviation between the average of the power setpoints and the average of the power measurements is computed and this deviation is transmitted to the control equipment EC.

In a final step 306, the control equipment EC decides to allocate more or fewer communication resources to the Earth station ST or to other stations of the system as a function of said deviation.

The steps 303, 304 of computing the averages and the step 305 of computing the power deviations are performed periodically to be able to supply this information to the control equipment regularly.

The invention notably exhibits the following advantages. It obviates the need to carry out an accurate calibration of the equipment of the Earth station, which has proven difficult for mobile stations and in particular for the calibration of the active components of the RF chain such as the high-power amplifier AHP. Moreover, the proposed solution remains operational even when a component of the chain is modified.

The invention makes it possible to optimize the satellite resources, in terms of the power effectively radiated by the stations and indirectly in terms of the bit rate allocated for communicating. It furthermore enables a better observance of the maximum admissible radiated power constraints as set by the regulations in force.

The invention also makes it possible to optimize the sharing of resources across all the stations of the communication network.

The invention claimed is:

1. A satellite communication device comprising:
an antenna for communicating with a satellite,
a power measurement apparatus configured to carry out a plurality of power measurements of an equivalent isotropically radiated power (EIRP) of the antenna;
a receiver configured to receive, periodically, an equivalent isotropically radiated power (EIRP) setpoint to be applied to a signal transmitted by said antenna, said EIRP setpoint being determined by a control equipment to reach a target link budget on a satellite link between said satellite communication device and another device of a same network;
a processor configured to:
compute an average, over a first time interval, of said plurality of power measurements,
compute an average, over a second time interval substantially identical to said first time interval, of EIRP setpoints in the second time interval,
compute a first error between the average of the EIRP setpoints,
compute a second error between the average of the plurality of power measurements,
compute a difference between the first error and the second error; and
a transmitter configured to transmit said difference to said control equipment, via said satellite.

2. The satellite communication device according to claim 1, comprising a high-power amplifier in which said power measurement apparatus is implemented, a power measurement in the plurality of power measurements being measured at an output of said high-power amplifier and corrected for a gain of the antenna.

3. The satellite communication device according to claim 2, comprising a radio frequency (RF) chain connected at an input thereof to the output of the high-power amplifier and at an output thereof to the antenna, the power measurement at the output of said high-power amplifier being further corrected for a gain of the RF chain.

4. The satellite communication device according to claim 1, wherein the power measurement at the output of the high-power amplifier is a peak power and said peak power is corrected for a peak factor of a modulation of the transmitted signal.

5. The satellite communication device according to claim 1, wherein the power measurement is corrected for a measurement bias depending on a power difference between a modulated carrier and an un-modulated carrier.

6. The satellite communication device according to claim 1, wherein said averages over the first and the second time intervals are sliding averages over a chosen time horizon.

7. A satellite communication system comprising:
  at least one satellite communication device including an antenna for communicating with a satellite;
  a measurement apparatus configured to carry out a plurality of measurements of an equivalent isotropically radiated power (EIRP) of the antenna;
  a receiver configured to receive, periodically, an equivalent isotropically radiated power (EIRP) setpoint to be applied to a signal transmitted by said antenna, said EIRP setpoint being determined by a control equipment to reach a target link budget on a satellite link between said satellite communication device and another device of a same network;
  a processor configured to:
    compute an average, over a first time interval, of said plurality of power measurements,
    compute an average, over a second time interval substantially identical to said first time interval, of EIRP setpoints in the second time interval,
    compute a first error between the average of the EIRP setpoints,
    compute a second error between the average of the plurality of power measurements,
    compute a difference between the first error and the second error; and
  a transmitter configured to transmit difference to said control equipment, via said satellite,
  the control equipment configured for controlling resources allocated within said satellite communication system, said control equipment comprising:
    an additional processor configured to compute the equivalent isotropically radiated power setpoint as a function of the target link budget to be attained on the satellite link between a first communication device and a second communication device,
    a control equipment transmitter configured to transmit the EIRP setpoint to said first communication device,
    a control equipment receiver for receiving another error between said EIRP setpoint and the equivalent isotropically radiated power transmitted by said first communication device, said another error being transmitted by said first communication device, and
    a resource management processor configured to allocate more or fewer communication resources to said first communication device or to other communication devices of the satellite communication system as a function of said another error.

8. The satellite communication system according to claim 7, wherein said resource management processor is configured to update a maximum admissible equivalent isotropically radiated power by adding said difference received at the control equipment receiver to the maximum admissible equivalent isotropically radiated power.

9. The satellite communication system according to claim 8, wherein said resource management apparatus is configured to make the following resource allocation decisions:
  if the EIRP setpoint transmitted to said first communication device is strictly below the maximum admissible equivalent isotropically radiated power, allocate available resources to said first communication device or to other communication devices of the satellite communication system,
  if the EIRP setpoint transmitted to said first communication device is strictly above the maximum admissible equivalent isotropically radiated power, reduce the resources allocated to said first communication device.

10. The satellite communication system according to claim 7, wherein said control equipment includes a loop for slaving a power of said first communication device configured to adjust the EIRP setpoint transmitted to said first communication device as a function of the resources allocated to said first communication device and of a target signal-to-noise ratio measured on a link between said first communication device and said second communication device.

11. The satellite communication system according to claim 7, wherein the allocated communication resources are bit rate or spectral efficiency resources.

12. A method for controlling resources allocated within a satellite communication system including at least one satellite communication device and a control equipment for controlling the resources within said satellite communication system, said method comprising the following steps:
  periodically computing an equivalent isotropically radiated power (EIRP) setpoint as a function of a target link budget to be attained on the satellite link between a first communication device and a second communication device,
  carrying out a plurality of power measurements of the equivalent isotropically radiated power of an antenna of said first communication device,
  computing an average, over a first time interval, of said plurality of power measurements,
  computing an average, over a second time interval substantially identical to said first time interval, of said EIRP setpoints,
  computing a first error between the average of the EIRP setpoints,
  computing a second error between the average of the plurality of power measurements,
  computing a difference between the first error and the second error, and
  allocating more or fewer communication resources to said first communication device or to other communication devices of the satellite communication system as a function of said difference.

13. The method for controlling resources according to claim 12, further comprising:
  a step of updating a maximum admissible equivalent isotropically radiated power by adding said difference to the maximum admissible equivalent isotropically radiated power.

14. The method for controlling resources according to claim 13, further comprising the following resource allocation decision step:
  if the EIRP setpoint transmitted to said first communication device is strictly below the maximum admissible equivalent isotropically radiated power, allocate available resources to said first communication device or to other communication devices of the system,
  if the EIRP setpoint transmitted to said first device is strictly above the maximum admissible equivalent isotropically radiated power, reduce the resources allocated to said first communication device.

* * * * *